United States Patent Office 3,453,122
Patented July 1, 1969

3,453,122
PAINT VEHICLE

Helmut Hans Wilhelm Weldes, Havertown, and David I. Netting, Springfield, Pa., assignors to Philadelphia Quartz Company, Philadelphia, Pa., a corporation of Pennsylvania
No Drawing. Filed May 17, 1966, Ser. No. 550,694
Int. Cl. C09d 5/10
U.S. Cl. 106—1                         11 Claims This invention is an improvement on self-curing zinc-rich organic ammonium silicate coating compositions whereby the surface hardness and the adhesion to the base metal are improved by including an alkali metal silicate solution. Our invention also includes more restricted compositions in which the stability of the paint is greatly improved over the stability with either component of the vehicle alone.

In our copending patent application Ser. No. 390,447, now U.S. Patent 3,372,038, we discussed the problems connected with similar coatings of the prior art and the advantages of using organic ammonium silicate binders. We have also discussed the general properties of the organic ammonium silicates. The properties of the alkali metal silicates are well known. The effect of various additives is also described and this exposition is hereby incorporated by reference into this application.

We prefer to use organic ammonium silicates that can be characterized by the formula:

$$X(N_nR_p{}^s)_2O \cdot YSiO_2 \cdot ZH_2O$$

wherein:

N represents a nitrogen atom; n is a small integer less than 10 and preferably less than 5; X, Y and Z represent numbers defining the relative amounts of each of the component parts of the compound. Specifically, X is 1, Y is preferably between 0.5 and 50, and Z is preferably between 0 and 99; R represents alkyl radicals containing between about 1 and 20 carbon atoms, at least one of which is an omega hydroxy alkyl group (preferably one or more of these R groups are ethanol groups and especially preferred are the alkyl ethanol combinations); up to four R groups are associated with each N;
P is at least 4, indicating total bonds of R groups to N; and
s is an integer from 1 to p, indicating the number of different types of R groups.

In a more specific sense, it is believed that the organic ammonium silicate settable components useful in connection with this invention can be characterized by the formula:

$$X(NR_1R_2R_3R_4)_2O \cdot YSiO_2 \cdot ZH_2O$$

wherein N, X, Y and Z have the significances noted above and $R_1$, $R_2$, $R_3$ and $R_4$ represent alkanol radicals containing between about 1 and 20 carbon atoms.

Preferred specific examples of organic ammonium silicates useful in accordance with this invention would include (a) sodium-free tetraethanolammonium silicate, (b) N,N,N' - tris-(β-hydroxyethyl)-N''-[tris-(β-hydroxyethyl)-ethylammonium]-piperazinium silicate, (c) diethanol morpholinium silicate, (d) hexaethanolethylene diammonium silicate, (e) methyl triethanolammonium silicate, (f) dimethyl diethanolammonium silicate, (g) ethyl triethanolammonium silicate.

Said copending patent application has to do with self-curing coatings having vehicles comprising organic ammonium silicates and metallic pigments from the group of zinc, aluminum, magnesium and other equivalent metal powders which are sacrificial metals with respect to iron. The class of organic ammonium silicates is described therein. As in that previous application, our improvement is described in terms of zinc metal powder which is the powder most often used in commerce. Aluminum metal is also often used because of its ability to form impervious layers of flaked pigment.

As described in our prior application, use of sodium and potassium silicate binders does not result in self-curing coating systems. The sodium silicate binders, however, are much less expensive than the quaternary ammonium silicate binders and are known to form harder surfaces with much stronger adhesion to the metal surface when they have been cured by a secondary treatment. It is known that organic ammonium silicate solutions and alkali metal silicate solutions may be mixed together but it would not be expected that such combinations in which a large proportion of the alkali metal silicate is included would self-cure at rapid rates under humid conditions. In fact, it is found that when the ordinary organic ammonium silicate vehicles and the commercial alkali silicate vehicles are mixed together  the shelf life of the mixed vehicle is quite short, e.g. a week or less, and for many commercial applications such mixtures are impractical. This is true even at low proportions of alkali silicate to organic ammonium silicate. However, these mixtures do form zinc-rich coatings with improved hardness and adhesion in comparison to coatings using the organic ammonium silicate vehicles of our co-pending application and, therefore, have a commercial application where the short shelf life can be tolerated.

Fortunately, we have discovered that this reduced shelf life can be overcome with the formation of coatings which are hard, adhere strongly to the base, resist moisture and self-cure. One would have expected that the addition of the alkali metal silicate to the organic ammonium silicate system would have reduced the corrosion resistance of the final paints as well as its moisture resistance and would have prevented self-curing.

What is most surprising is that while the OAS (organic ammonium silicate) vehicles are stable for 6 to 8 months over a wide range of dilution, if the total silica content is reduced to about 24% or lower the combined, or mixed, system of organic ammonium silicate and alkali metal silicate is more stable than the organic ammonium silicate vehicle alone even though the crystalloidal silica of the alkali metal silicates does not appear to be shifted to the colloidal state. Furthermore, an organic ammonium silicate vehicle aged to about the thickening point may be diluted and combined with sodium silicate or alkali metal silicate and the same long life can be obtained. 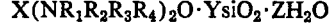 These new compositions are also more economical because of the reduced cost of the vehicle and a reduced zinc requirement.

In these improved systems we may use organic ammonium silicates with ratios of silica to organic ammonium ion of between about 4.5 and 13, and sodium silicates for instance between about 2.0 and the highest presently available commercial ratio of about 4.0. Equivalent potassium and lithium silicates may be employed at considerably greater cost.

For best results we prefer to use an alkali metal silicate solution which has largely crystalloidal silica.

While we have been primarily concerned with the liquid form of alkali silicate, it is feasible to mix an easily soluble, dry, powdered alkali metal silicate with the zinc metal. When this mixture is combined with the organic ammonium silicate vehicle, a system forms which results in an even harder coating since the alkali metal silicate is freshly dissolved.

We may also employ NaOH or KOH with more highly siliceous organic ammonium silicates. These alkalies react to first form a gelatinous mass which later liquifies as an equivalent system to organic ammonium silicate and alkali metal silicate. In other words, the alkali metal ion, the organic ammonium ion and silicate ion reach an equilibrium in the system which does not depend on the initial form of the components.

Of the quaternary ammonium cations we prefer to employ mixed alkyl alkanol ions since they appear to permit improved stability over the quaternary alkanol ions. Therefore, we prefer to use methyl triethanol ammonium silicate instead of tetraethanol ammonium silicates.

Specifically, we have found that if the silica content of the vehicles is greater than about 24%, the vehicle will thicken relatively soon and have a relatively shorter shelf life, e.g., a week or less, whereas if the silica is kept below 24% (and preferably about 20%) the shelf life will be commercially feasible (e.g. many months). However, the silica content must be at least about 15% to obtain reasonably satisfactory properties in the cured coating. As shown in our above mentioned application No. 390,447, the organic ammonium silicate vehicles require considerably higher silica content in order to obtain satisfactory coating properties.

As we have stated earlier, we prefer to add an agent which will make the finished coating mixture thixotropic. We have found that hydrous magnesium silicates are especially suitable. Other systems of water soluble gums and talc, etc. may also be used. We also find that the use of more finely divided zinc powders results in a harder coating and it is known to include other clays and metal oxides in such systems.

EXAMPLES

In the examples which follow we have used the following materials:

ALKALI METAL SILICATES

| Registered Trademark | Ratio $SiO_2/Na_2O$ | Na 20% | Source |
| --- | --- | --- | --- |
| "GD" | 2.0 | 27 | Philadelphia Quartz Co. |
| "N" | 3.22 | 8.9 | Do. |
| "S-35" | 3.75 | 8.75 | Do. |
| "Kasil" | ($SiO_2/K_2O$) 2.5 | 8.3%($K_2O$) | Do. |

Hydrous magnesium silicates

Registered trademark:     Source
  "Ben-A-Gel" _____ National Lead Co.
  "Benaqua" _____ National Lead Co.

Powdered zinc metal

"Asarco" #1 _____ American Smelting & Refining Co.
  "Asarco" #111 _____ Canadian Zincoli Pigments Ltd.
  "Zincoli" #620 _____ New Jersey Zinc Co.
  #44 _____ New Jersey Zinc. Co.
  #444 _____ New Jersey Zinc. Co.

The following test methods were employed:

Water resistance was measured by first coating cold rolled steel panels 4 x 8" in area and with a 100 micron simulated sandblasted surface. The paint was brushed or sprayed on the clean surface, dried for an hour and immersed for 10 minutes in water at room temperature. Another similar sample was tested in boiling water. The panel was then removed and rubbed with the fingers. If nothing can be rubbed off in this way, the coating is rated as insoluble.

Hardness was determined with a standard abrasion tester, Model 174 from the Taber Instrument Corporation. CS-17 wheels with 1000-gram weights are used, and the weight loss after the designatel number of cycles is recorded as a measurement of the hardness of the coat. Thus, the smaller the weight loss, the harder the coating.

Adhesion was measured with a Hoffman scratch hardness tester by pulling the tester at a 90° angle beginning at a scratch through the coating. Results are reported in grams of weight at which the coating is removed.

Example 1

In this example, we describe the preparation of a paint prepared according to our copending application Ser. No. 390,477. Such a paint may be made up from a vehicle containing 71.1 parts by weight of methyltriethanol ammonium silicate having a ratio of 12.5 moles of $SiO_2$ to one mole of the quarternary ammonium ion and a concentration of 45% $SiO_2$ Ben-A-Gel is dispersed in water at 1.6% concentration with rapid high-shear agitation and then 28.9 p.b.w. of the dispersion is similarly mixed with the organic ammonium silicate. This mixture has a concentration of 32% of $SiO_2$ and a density of 10.3 pounds per gallon. A zinc-rich paint is prepared by combining 7.13 pounds of the vehicle with 18.75 pounds of finely divided zinc dust such as Asarco #1. The paint then has a density of 25.87 pounds per gallon and contains 72.4% of pigment with 27.6% of vehicle. This is a zinc pigment to binder weight ratio of 2.6. The dry paint film formed from this paint contains 87.0% of zinc. Such a coating is insoluble when tested for water resistance and has a Taber hardness at 20 cycles of 0.370 gram weight loss. The total weight of coating in the abraded area is only about 0.40 gram. The adhesion strength of the coating to the adherend is 300 grams.

Example 2

In this example the effect of decreasing the proportion of the organic ammonium silicate in the final paint was compared. It was found that as the percent of silica in the final coating was reduced below about 20%, the coat became somewhat soluble in that it could be rubbed off slightly, the hardness of the coat decreased sharply, and the adhesion of a two-coat application declined sharply. The organic ammonium silicate was the same as that used in Example 1.

| Percent Silica | Thickness, one coat (mills) | Adhesion, one coat (g.) | Hardness [1], one coat (10 cycles) (g.) | Water resistance,[2] one coat |
| --- | --- | --- | --- | --- |
| 32 | 1.5 | 200–300 | 0.127 | Could not be rubbed off. |
| 28 | 2.0 | 300–400 | 0.1794 | Do. |
| 24 | 1.75 | 200–300 | 0.213 | Do. |
| 19 | 1.0 | 100 | | Could be rubbed off slightly. |
| 15 | 1.5 | 200 | 0.314 | Could be rubbed off easily. |

[1] Hardness in this case was determined after only 10 cycles with the Taber abraser.
[2] Water resistance was determined after drying for 24 hours and then soaking in cold water for only 5 minutes.

Salt fog tests were carried out on this series, and it was found that they all showed very satisfactory performance except at about 15% $SiO_2$.

Example 3

In this example it is shown that as little as 24% of a sodium silicate ("N") will greatly improve the hardness of the coating without impairing the solubility, even up to about the addition of 50% of the binder as the "N" sodium silicate. However, the viscosity of the mixtures after aging after only one week is greatly increased. In these compositions the organic ammonium silicate contained only 34% of $SiO_2$ with the same ratio and cation as in Example 1. The vehicle was prepared by mixing 100 parts of the organic ammonium silicate at a concentration of 34% $SiO_2$ with varying parts by weight of the "N" sodium silicate having about 29% $SiO_2$. With up to 30 parts by weight of the "N" sodium silicate, the stability of the mixture after one week, as shown by the viscosity, was practically unchanged over the original organic ammonium silicate. However, with 40 to 50 parts the mixture was found to be slightly more viscous, and with from 60 to 80 parts the mixture was definitely much more viscous, and with 90 to 100 parts the combination was found to be very viscous.

A paint mixture was prepared using 65 parts by weight of the zinc dust Asarco #1 and 20 ml. of the organic ammonium silicate mixed with the sodium silicate. This vehicle had been aged one day. The coating prepared from the mixed paint was found to be insoluble after one hour of drying up to an addition of about 90 parts by weight of the sodium silicate to 100 parts by weight of the organic ammonium silicate. With more sodium silicate the coating was rated soluble.

Without the addition of any sodium silicate, such a coating after 20 cycles had a hardness of 0.15. However, even at only 30 parts by weight of sodium silicate to a hundred of the organic ammonium silicate, the hardness was 0.003 and with 90 parts by weight of the sodium silicate, it was 0.002. The adhesion of the coating without the addition of sodium silicate was 300 grams, whereas with the 30 parts by weight it increased to 1000 grams, and with 90 parts by weight it had increased to 2000 grams.

In compositions where the sodium silicate was in excess, for instance 100 parts by weight of sodium silicate to only 30 parts by weight of the organic ammonium silicate, the mixture was so viscous that it did not flow after a week. The coating, naturally, was soluble after one hour of drying, but it had a hardness of 0.014 even after 100 cycles. This compares to 0.016, when the proportions were reversed. The adhesion of the coating was well over 2000 grams. Instead of the sodium silicate, varying amounts of sodium hydroxide could be mixed with the organic ammonium silicate, forming first a coacervate which then dissolved and left a stable vehicle which formed paint films which were insoluble after drying one hour, but with somewhat reduced hardness compared to the sodium silicate combinations. For instance with 20 to 60 parts by weight of sodium hydroxide (11.5% NaOH) to 100 parts by weight of the organic ammonium silicate, the hardness after 20 cycles was about 0.01, whereas increasing amounts of the sodium silicate formed harder coatings.

The sodium hydroxide reacts with some of the silica present in the organic ammonium silicate forming the same composition which would have been formed using an organic ammonium silicate of lower silica ratio and the sodium silicate such as sodium metasilicate or sodium disilicate.

Example 4

In this example a mixture of the quaternary ammonium silicate and sodium silicate aged for over 5 weeks and mixtures of this same organic ammonium silicate with potassium silicate aged for two weeks were used as the vehicle, and it was found that aging these mixtures did not greatly affect the final products although there is some advantage in using a fresh mixture of the alkali metal silicate with the organic ammonium silicate.

When 30 parts by weight of the "N" sodium silicate were mixed with 100 parts by weight of the organic ammonium silicate in Example 3 and aged for 21 days, the resulting paint coat prepared as in Example 1 was insoluble after one hour drying, and after 20 cycles had a Taber hardness of 0.031. The adhesion was 500. With a somewhat similar composition in which 40 parts by weight of the "N" sodium silicate were used with 100 parts by weight of the organic ammonium silicate of Example 3 and 20 parts by weight of water, the mixture was aged for 37 days and the resulting zinc-rich coating formed a film which was insoluble, had a hardness after 20 cycles of 0.020 and an adhesion of 600. When 80 parts by weight of Kasil #1 potassium silicate containing 20.8% of $SiO_2$ were mixed with 100 parts by weight of the same organic ammonium silicate and aged 14 days before the coating was prepared, the resultant coating was insoluble after 1 hour's drying and had a hardness of 0.043 after 20 cycles, and an adhesion of 500.

Example 5

The use of a higher ratio sodium silicate produces a somewhat more water resistant coating at the risk of a slight loss in hardness. Aging of the vehicle of mixed organic ammonium silicate and sodium silicate does not influence paint properties very much, although the mixture becomes somewhat more viscous. For instance, when 20 parts by weight of S 35 sodium silicate having 25.3% of $SiO_2$ were mixed with 100 parts by weight of this organic ammonium silicate of Example 3 the paint produced was insoluble after one hour's drying and had a hardness of 0.69 after 20 cycles. The adhesion was 500. When 60 parts by weight of the S 35 were used, the coating was still insoluble and had an adhesion of 800, but tended to flake off in the hardness test. Similarly when 80 parts by weight of the S 35 were used, the coating was somewhat soluble, even though the hardness had been increased to 0.008 and the adhesion had increased to 900.

On aging the vehicle for three weeks the paint in the first case was slightly more viscous, but the other results were similar, except for a slight increase in adhesion to about 700. However, when the mixture with 60 parts by weight had been aged for three weeks, the mixture was quite viscous, but it did not flake off in the hardness test, and had a hardness of 0.005 at 20 cycles, and an adhesion of 1400. With the 80 parts by weight after three weeks the vehicle was also quite viscous, but it formed an insoluble coating with a hardness of 0.006 after 20 cycles and an adhesion of 1100.

The use of the sodium silicate having a ratio of $$4SiO_2:Na_2O$$

offered only slight improvement over the S 35.

Example 6

In the previous examples we have demonstrated that organic ammonium silicate coatings with improved hardness and adhesion and without serious deterioration in their water resistance or self-curing characteristics, can be prepared by adding commercial alkali metal silicate solutions to the organic ammonium silicate vehicle.

We have further found that these mixed vehicles increase in viscosity on aging so that the shelf life is seriously decreased over that of either the organic ammonium silicate or the alkali metal silicate solution alone. Surprisingly, we have found that mixtures of very good stability can be obtained if we decrease the silica content of the vehicle below about 24%. For instance, using sodium silicate "N" in the proportion of about 40 parts by weight to 100 parts by weight of the same organic ammonium silicate used in Example 3 and diluting with water to a silica concentration of 29%, we find that the viscosity obtained using a Brookfield viscometer Spindle #2 at 20 r.p.m. is about 21 centipoises at the end of one day and about 80 centipoises at the end of the month, but in a month and a half the viscosity increases to about 216 centipoises. Such a short shelf life is not commercially acceptable, and the sodium silicate and organic ammonium silicate usually have to be mixed shortly before preparing the final paint.

If we use the same composition but reduce the silica concentration to 27%, the original viscosity after one day is about 18 centipoises, and is increased to only 45 centipoises after a month and a half. This is still a rather viscous solution, and a considerable increase in viscosity. However, if the silica concentration is dropped to 24%, the initial viscosity is about 16 centipoises and is still only about 20 centipoises after a month and a half, and at 20% silica the initial viscosity is about 13 centipoises, and it has not changed significantly after 2.5 months. If the sodium silicate is increased to 60 parts by weight and sufficient water added to reduce the silica content to 25%, there still is a considerable increase in viscosity as the viscosity is about 20 centipoises after one day and about 92 after only a month and a half.

At 20% silica the ratio of the sodium silicate may be changed considerably and the viscosity shows no tendency to increase. Vehicles were prepared ranging from 1.25 parts of organic ammonium silicate to one part of "S 35" to 0.835 parts or organic ammonium silicate to one part of "S 35," with little or no change in viscosity in the course of the month.

The ratios of organic ammonium silicate to sodium silicate in this example were 2.5 and 1.66. Coatings made from the above vehicles at 20% silica were definitely more insoluble after the vehicle was aged 25 days compared to aging for three days. Water resistance tests were carried out with both cold and hot water. The effect on hardness and adhesion was not pronounced.

Example 7

In this example, 2.1 p.b.w. of the organic ammonium silicate in Example 1 was mixed with 1.1 p.b.w. of "N" sodium silicate and diluted to 20% of $SiO_2$. The silica from the organic ammonium silicate was three times as much by weight as the silica from the sodium silicate. This vehicle was stable and a paint was prepared after 3 weeks. The paint was made up with "Zincoli 620" superfine zinc powder, in the same proportions as in Example 1, and 2% of "Ben-A-Gel" was added. In the water resistance test, the coating was insoluble, both in cold water and in boiling water. After 20 cycles it had a hardness of 0.034.

Example 8

A vehicle was made having the same ratio of organic ammonium silicate to "N" sodium silicate as in the preceding Example 7, except that the organic ammonium silicate was tetraethanolammonium silicate with 44.9% $SiO_2$ and the same silica to cation ratio as the organic ammonium silicate in Example 1. The pH was 11.0 and viscosity was 64 c.p.s. at 25° C. This was diluted to 20% silica and had good stability. After aging for a week, zinc-rich coatings formed with this vehicle were insoluble in both cold and in boiling water, and the hardness after 20 cycles was 0.105. With "S 35" sodium silicate the coatings were also insoluble, and somewhat harder. The tetraethanol ammonium silicate coatings were more water resistant than the methyltriethanol ammonium silicate coatings.

Example 9

The ratio of zinc dust to vehicle has a slight effect on the hardness of the final paint coating. For instance, at a ratio of 2 parts by weight of zinc dust Asarco # 1 to 1 part of a vehicle having 3 parts of organic ammonium silicate as in Example 1 to one part of "N" sodium silicate, all diluted to 20% $SiO_2$, the hardness after 20 cycles was found to be 0.021 whereas with a ratio of 3.5 parts of zinc dust to one of vehicle the hardness was 0.044 after 20 cycles.

In these tests we have varied the ratio by weight of the silica from the organic ammonium silicate to the weight of the silica from the alkali metal silicate over a range from about 0.96 to about 3.0 with very satisfactory results.

We have also varied the ratio of the organic ammonium silicate to the liquid alkali metal silicate of commerce from about 0.7 to about 10 but we usually prefer about 1 to 3.

Example 10

It is not necessary to use liquid mixtures for these formulations. Actually dry compositions of powdered alkali metal silicate and organic ammonium silicate can be prepared in which only water is necessary to form the finished coating composition. In developing these systems one must have a powdered silicate of sufficiently rapid solubility. The ordinary high ratio sodium silicate powders of about 3.2 $SiO_2$:1 $Na_2O$ are usually too slowly soluble in water at room temperature to be satisfactory. On the other hand the more rapidly soluble sodium silicate powders at lower ratios limit the amount of alkali metal silicates which can be added and still retain the insolubility of the coat. At present the most satisfactory silicate powder is one having a ratio of 2 $SiO_2$ to $Na_2O$. Since powdered potassium silicates are more soluble, higher ratio powders are more rapidly satisfactory.

One advantage of using the powdered mixture is that the alkali metal silicate solution is fresh when dissolved in water and the final insolubility of the coat tends to be greater and of course there is no question of increasing viscosity and more concentrated vehicles may be used.

Such soluble alkali metal silicate powders are however much more expensive and increase the cost of the coating.

A paint is prepared with 63 parts by weight of the Asarco #1 zinc powder, 2 parts by weight of "GD" sodium silicate and 20 ml. of the liquid organic ammonium silicate of Example 3. The coating had a Taber hardness of 0.006 with some solubility after one hour drying. However, when 1.3 parts of "GD" sodium silicate are mixed with 63.7 parts by weight of Asarco #1 powdered zinc and 20 ml. of the same organic ammonium silicate diluted to form a solution of 24% silica, the coating is insoluble; has a hardness of 0.056 and adhesion of 1500 grams. With 2 parts by weight of the "GD" silicate, 63 parts by weight of the Asarco #1 zinc dust and 20 ml. of the organic ammonium silicate all diluted to 19% silica, the adhesion was 1800 and the coating was slightly soluble and had a hardness of 0.084 at 20 cycles.

In another series at 24% silica and 2% of the "GD" based on the weight of the zinc dust which in this case was #444 from the New Jersey Zinc Company, a coating formed after aging the paint for 15 minutes was insoluble, had a hardness of 0.0175 and adhesion of 500. The same results were obtained after aging the paint for three hours. Very little difference was found in varying the zinc dust. Those which are finer are of course likely to give a smoother coating and they also tend to have a higher adhesive strength and a somewhat greater hardness.

Example 11

A preferred coating composition consisted of the vehicle having 20% by weight of $SiO_2$ wherein three-fourths of the silica were contributed by the methyl triethanol ammonium silicate of Example 1 and one-fourth by "N" sodium silicate. This was prepared by mixing 1.1 parts of "N" silicate with 2.1 parts by weight of the organic ammonium silicate. To this was added a mixture of 1.8 parts by weight of water to which 0.03 parts by weight of Ben-A-Gel had been added with high shear agitation. This thickened water and the vehicle were mixed and an additional 1.31 parts by weight of water were added with high shear agitation. The pH at 25° C. was 11.3 and the viscosity at 25° C. was 1500 c.p.s. using the Brookfield spindle No. 2 at 20 r.p.m. The density of the finished vehicle was 9.8 pounds per gallon. This vehicle weighing 6.35 parts by weight was mixed with 15.9 parts by weight of zinc dust giving a weight ratio of pigment to binder of 2.5 with 91.2% of the zinc in the dry film. After one hour drying, the coating was insoluble in cold water as well as in boiling water. On further drying for 24 hours, the coating remained insoluble and had an adhesion of 500 grams. Its hardness after 100 cycles was 0.07 grams weight loss.

Example 12

Another preferred composition was prepared using our organic ammonium silicate of Example 1 diluted with water thickened with Ben-A-Gel as in the above example. To zinc dust was added 2% by weight of the "GD" sodium silicate. The paint was prepared by diluting 3.6 parts by weight of the organic ammonium silicate of Example 1 with water thickened with Ben-A-Gel to form a total of 6.75 parts by weight of vehicle containing 24% of $SiO_2$. The pigment was a mixture of 17.5 parts by weight of zinc dust and 0.35 parts by weight of "GD" and thus the final coating had a weight ratio of 2.65 parts of pigment to vehicle. Such coatings prepared from this vehicle were water resistant after one hour drying, had a hardness of 0.056 grams of weight loss after 20 cycles and a Hoffman adhesion of 1500 grams.

More or less detailed claims will be presented hereinafter. Even though such claims are rather specific in nature those skilled in the art to which this invention pertains recognize that there are obvious equivalents to the specific materials recited herein. Some of these obvious equivalents are disclosed herein. Other obvious equivalents will immediately occur to one skilled in the art; and still other obvious equivalents could be readily ascertained on upon rather simple routine non-inventive experimentation. Certainly no invention would be involved in substituting one or more of such obvious equivalents for the materials specifically recited in the claims. It is intended that all such obvious equivalents be encompassed within the scope of this invention and patent grant in accordance with the well-known doctrine of equivalents as well as changes in the proportion of the ingredients which do not render a composition unsuitable for the disclosed purposes. Therefore, this application for Letters Patent is intended to cover all such modifications, changes and substitutions as would reasonably fall in the scope of the intended claims.

What we claim is:
1. A coating composition for imparting corrosion resistance to corrodible metal surfaces comprising a finely divided metallic pigment selected from the group consisting of zinc and aluminum, and a binder consisting essentially of:
    (a) an organic ammonium silicate which is characterized by the formula:

$$X(N_n R_p{}^s)_2 O \cdot Y SiO_2 \cdot Z H_2 O$$

wherein:
    N represents a nitrogen atom; $n$ is a small integer less than 10 and preferably less than 5; X, Y, and Z represent numbers defining the relative amounts of each of the component parts of the compound, and more specifically, X is 1, Y is preferably between 0.5 and 50, and Z is preferably between 0 and 99; R represents alkyl radicals containing between 1 and 20 carbon atoms, at least one of which is an omega hydroxy alkyl group; up to four R groups being associated with each N;
    $p$ is at least 4, indicating total bonds of R groups to N; and
    $s$ is a an integer from 1 to $p$, indicating the number of different types of R groups,
    (b) a finely divided zinc powder in the amount of between about 6 to 20 grams of zinc powder per gram of $SiO_2$,
    (c) an alkali metal silicate,
        (1) the total silica content of the binder being within the range of about 15% to about 24%,
        (2) the ratio of silica to organic ammonium ion in the organic ammonium silicate preferably ranging between about 4.5 and 13,
        (3) the ratio of silica to alkali metal ion in the alkali metal silicate preferably ranging between about 2.0 and 4.0, and
        (4) the ratio of the organic ammonium silicate to the alkali metal silicate being within the range of about 0.7 to about 10.

2. A coating composition according to claim 1 wherein the metallic pigment is zinc.
3. A coating composition according to claim 2 which also includes a filler.
4. A coating composition according to claim 3 wherein the filler comprises a hydrous magnesium silicate.
5. A metal coated with the composition as set forth in claim 1.
6. A metal coated with a base coat of the composition set forth in claim 1 and an overcoat of a composition comprising (a) a binder of the organic ammonium silicate set forth in claim 1 and (b) a finely divided lead oxide.
7. The process of preparing a corrosion resistant coating composition for metal comprising admixing an organic ammonium silicate as defined in claim 1 and an alkali metal silicate with a finely divided metallic pigment selected from the group consisting of zinc and aluminum, the total silica content of the binder being within the range of about 15% to about 24%, the ratio of silica to organic ammonium ion in the organic ammonium silicate preferably ranging from between about 4.5 and 13, the ratio of silica to alkali metal ion in the alkali metal silicate preferably ranging between about 2.0 and 4.0, and the ratio of the organic ammonium silicate to the alkali metal silicate being within the range of 0.7 to about 10.
8. The coating composition according to claim 1 in which the quaternary ammonium silicate is methyl triethanol-ammonium silicate.
9. A process according to claim 7 wherein the quaternary ammonium silicate is methyl triethanolammonium silicate.
10. A coating composition according to claim 1 wherein the ratio of quaternary ammonium silicate to alkali metal silicate is within the range of about 1 to about 3.
11. A vehicle binder for coating compositions comprising:
    (a) an organic ammonium silicate as defined in claim 1, and
    (b) an alkali metal silicate,
        (1) the total silica content of the binder being within the range of about 15% to about 24%,
        (2) the ratio of silica to organic ammonium ion in the organic ammonium silicate preferably ranging between about 4.5 and 13,
        (3) the ratio of silica to alkali metal ion in the alkali metal silicate preferably ranging between about 2.0 and about 4.0, and
        (4) the ratio of the organic ammonium silicate to the alkali metal silicate being within the range of about 0.7 to about 10.

References Cited

UNITED STATES PATENTS

| | | | |
|---|---|---|---|
| 2,664,405 | 12/1953 | Andersen et al. | 106—287 XR |
| 2,689,245 | 9/1954 | Merrill | 106—287 XR |
| 3,287,142 | 11/1966 | Russell | 106—14 |
| 3,301,853 | 1/1967 | Weldes | 106—38.35 XR |
| 3,333,973 | 8/1967 | Frieman | 106—14 XR |

JULIUS FROME, *Primary Examiner.*

L. HAYES, *Assistant Examiner.*

U.S. Cl. X.R.

106—14, 38.35, 84, 287; 117—131, 135.1